(12) United States Patent
Hansen et al.

(10) Patent No.: US 9,934,477 B1
(45) Date of Patent: Apr. 3, 2018

(54) PROTECTED DOMAIN WORKFLOW ACCESS CONTROL SYSTEM

(71) Applicant: Amazon Technologies, Inc., Reno, NV (US)

(72) Inventors: Zachary J. Hansen, Seattle, WA (US); Matthew Paul Baranowski, Seattle, WA (US); Wyatt D. Camp, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 13/677,171

(22) Filed: Nov. 14, 2012

(51) Int. Cl.
| | |
|---|---|
| *G06Q 10/00* | (2012.01) |
| *G06Q 10/06* | (2012.01) |
| *G06F 12/14* | (2006.01) |
| *G06F 21/00* | (2013.01) |
| *G06F 11/07* | (2006.01) |

(52) U.S. Cl.
CPC .. *G06Q 10/063112* (2013.01); *G06F 11/0793* (2013.01); *G06F 12/14* (2013.01); *G06F 21/00* (2013.01); *G06Q 10/06316* (2013.01)

(58) Field of Classification Search
CPC ...... G06F 11/0793; G06F 21/00; G06F 12/14; G06Q 10/06316; G06Q 10/063112
USPC ............ 705/7.14, 7.26; 714/2; 713/189, 164
See application file for complete search history.

(56) References Cited

U.S. PATENT DOCUMENTS

| 8,260,739 B1 * | 9/2012 | Pelletier ............................ 700/2 |
| 2012/0095797 A1 * | 4/2012 | Nishimura et al. .......... 705/7.13 |
| 2013/0006717 A1 * | 1/2013 | Oleson et al. ............... 705/7.41 |
| 2013/0103841 A1 * | 4/2013 | Werth ................... G06F 9/4446 709/227 |

OTHER PUBLICATIONS

Musich, Tools Keep Networks Up and Running: Tioga Self-Healing System, PC Week, Nov. 9, 1998, at 113 (Year: 1998).*

* cited by examiner

*Primary Examiner* — Beth V Boswell
*Assistant Examiner* — Charles Guiliano
(74) *Attorney, Agent, or Firm* — Lee & Hayes, PLLC

(57) ABSTRACT

Techniques are described for providing selective access to secure physical and/or logical domains for agents that need to perform work in those domains. A work order will detail work to be performed by one or more agents, such as a technician or software agent, that will need access to protected domains to perform the work, and the tasks requiring agent access to the protected domains are controlled and completion thereof verified. Interaction with a monitoring/security system for the protected physical domains occurs to selectively allow access of the agent to the protected domain(s) as needed for the tasks. Other aspects of the disclosure are described in the detailed description, figures, and claims.

36 Claims, 5 Drawing Sheets

PROTECTED DOMAIN WORKFLOW ACCESS CONTROL SYSTEM

BACKGROUND

It is common for facilities that have sensitive or valuable items to keep those items in a secure part of the facility with limited access to the items. Typically, physical barriers are utilized to protect physical items, such as computer equipment, with a security system being employed to monitor access through the physical barriers to the secure physical domain and limit the access thereto. Examples of such systems are secure door and electronic lock systems, personnel location monitoring systems within a facility, and motion detectors.

For sensitive logical computer domains, logical access barriers and security systems are utilized to protect unauthorized access to the logical domain. Examples of such security systems are firewalls, restricted communication paths, and controlled network access.

One problem arises in both the physical and logical secure domains in that access is often necessary to the protected domain to perform maintenance and other work tasks on the items or software/systems within the protected domain. For example, if a secure physical domain holds computer equipment that needs work, a technician will have to physically enter the secure domain to perform the work and accordingly must have the requisite ability to do so per the security system. In the logical secure domain, a programmer or an intelligent software agent may need to have access to protected domain for programming purposes such as software updating or system repair.

DETAILED DESCRIPTION

Figure 1:
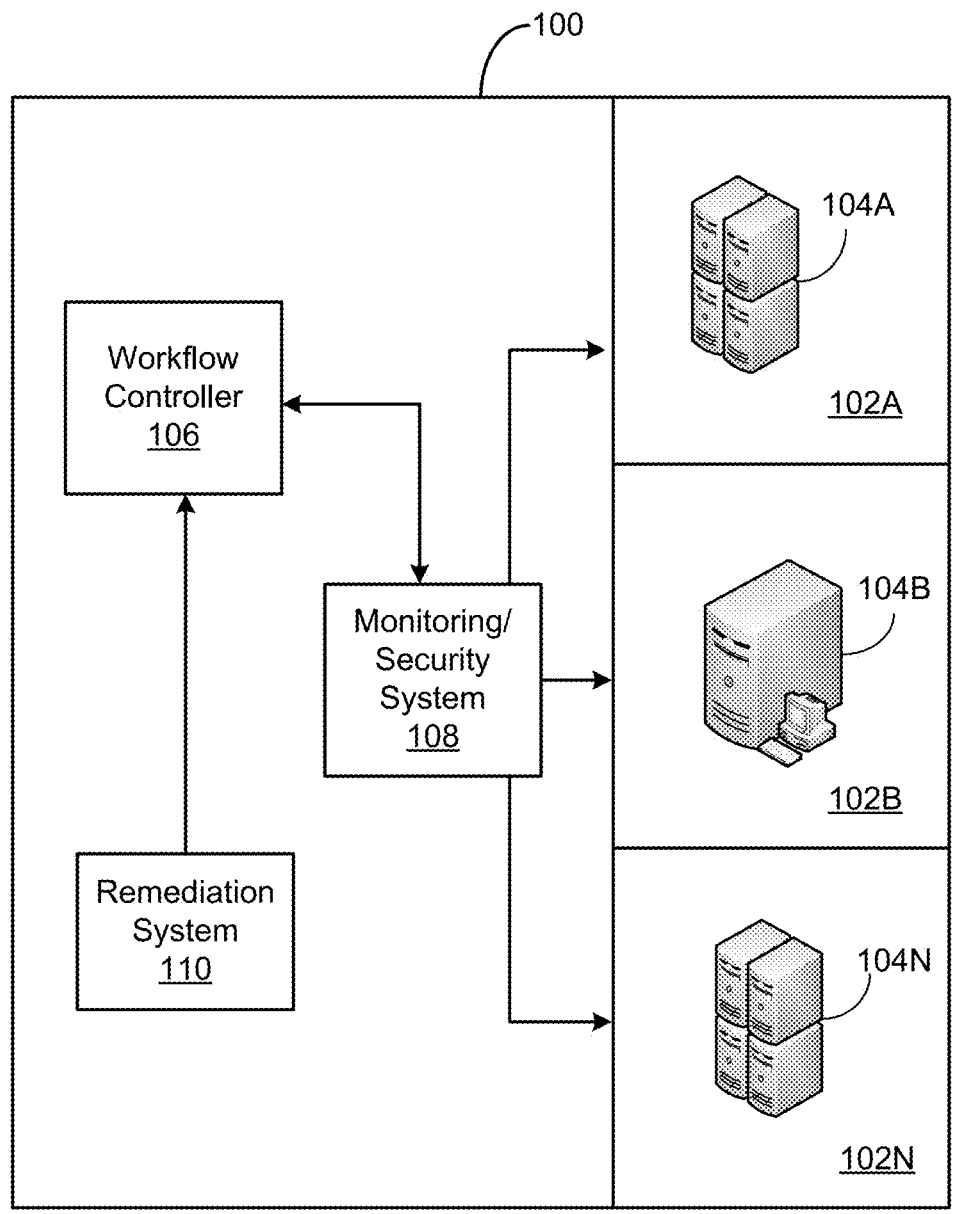
FIG. 1 illustrates an example of a secure facility having a plurality of protected physical domains, and a workflow controller coordinates the access needs to the protected domains produced from a remediation system with a monitoring and security system for the protected physical domains.

This disclosure describes a system and method that configures permissions for access to secure physical and/or logical domains by agents that need to perform work in those protected domains. In an embodiment, a work order is generated typically for maintenance or repairs to equipment in the protected domain, and may detail the work to be performed by one or more agents, such as a technician, robot, or software agent, that will need either physical and/or logical access to protected domains to perform the work. At least one task for the agent is created and permissions are then configured for the agent to have any requisite access to the protected domains, such as interaction with a monitoring/security system for the protected physical domains occurs to allow access of the agent to the protected domains based upon the created task.

In one embodiment, the system and method facilitates access of agents to protected domains to perform work therein though receiving a work order for work to be performed within a plurality of protected domains. The work order can be manually input by an agent or generated by a remediation system or other maintenance service periodically and/or in response to the occurrence of an event. At least one task is then created for an agent to access at least one of the protected domains based upon the work order, and the necessary permissions are configured, such as interactions made with a monitoring/security system of the protected domains, to selectively allow access of the agent to the protected domains based upon the created task(s). Then the completion of the task is verified, which can occur either from data sent by the agent or through interaction with other computer systems, such as the security or monitoring system.

One example of a facility with a plurality of protected domains is a data center 100 (in FIGS. 1 and 2) that includes both physically secure domains that protect equipment and secure logical domains that protect software and systems. Thus, if the protected domain is a secure physical domain, configuring permissions can be interaction with a monitoring system to allow physical access of an agent to the secure physical domain based upon the created task. When the secure physical domains are located in a facility that includes a security system controlling access to the secure physical domains, the work order is for work to be performed within at least one of the secure physical domains, configuring permissions can be interacting with the security system to allow access of the agent to the secure area of equipment to perform the task(s).

The facility is not limited to a data center 100 however as the present system and method can be performed in any setting where limited access is given to physical domains and personnel will have necessary periodic access. Examples are secure warehouses with valuables, storage facilities with sensitive documents, and military, penal and other buildings with limited internal personal access.

When the protected domain is a secure logical network domain, the agent can be a computing resource, such as a software agent. In such embodiment, the secure logical network domains have computing resources therewithin, and a security system controls data access to the secure logical network domains, and the work order is for work to be performed on computing resources within at least one of the secure logical network domains. Then configuring the requisite permissions can be interaction with the security system to allow data access of an agent to the computing resources within the secure logical network domain. Verification of the completion of the task can be had from data sent by the intelligent agent or interaction with the security system.

Thus, the access control permissions needed by the agent can vary from the physical to the virtual/system level. Examples of such access permission grants are physical access to doors and passageways, log-in credentials, administrative rights, rack access, time-limited access, etc.

The system and method can contact other computer systems to assist and verify the completion of the task(s) by the agent within a protected domain, such as contacting a server that sends an agent to a specific domain or a maintenance server that prints out an ordered task list for a technician within a data center. The system and method can also be embodied as creating the work order itself, and can receive data regarding resources held within the plurality of protected domain, and create a workflow, i.e. a schedule of tasks and actions that need to be performed to satisfy the work order. Furthermore, the system and method can monitor the performance of the workflow task(s) by the agent or technician and give appropriate notices and take actions should a discrepancy occur with the permitted access to the protected domain, e.g. the agent has remained too long in the protected domain or never entered the protected domain thereby not apparently performing the task. The permitted access rights for the agent can then be revoked after the tasks have been performed.

FIG. 1 and the following description are intended to provide a brief, general description of a suitable environment in which the embodiments described herein may be implemented. In particular, FIG. 1 illustrates an example of a secure facility being a data center 100 having a plurality of protected physical domains 102A-102N, which are secure rooms that have limited access to computer equipment 104A-104N, typically through electronic door lock system (not illustrated) and other physical alarms and monitoring (e.g. motion detectors). Thus, technicians that need to access the equipment 104A-104N will need to comply with the monitoring/security system 108 to be able to perform any requisite work in the protected physical domains 102A-102N. For example, each domain 102A-102N may include a card reader system (not shown), wherein the card reader system communicates with the monitoring/security system 108 that uses access control permissions to determine whether to grant physical access of a person to the domain.

In this embodiment, a workflow controller 106 coordinates the access to the protected domains 102A-102N in accordance with a work order produced from a remediation system 110, and the workflow controller 106 will interact with the monitoring/security system 108 to provide the necessary access to the protected domains 102A-102N as dictated by the scope of the work order. In this embodiment, an example of a workflow order from the remediation server 110 for work to be performed by one or more agents within a plurality of protected domains 102A-102N could be for a technician to enter protected domain 102A and replace a hard drive in equipment 104A. At least one task is then created by the workflow controller 106 for an agent to access protected domain 102A based upon the workflow order, e.g. a technician needs access to the protected domain 102A within the next 30 minutes to access the hard drive in equipment 104A. Furthermore, the workflow controller 106 can also determine which specific agent(s) should be used to perform tasks for the work order.

The necessary interactions are made from the workflow controller 106 with the monitoring/security system 108 of the protected domain 102A to selectively allow access of a technician to the protected domain 102A based upon the created task, e.g. allow the technician's key card to open the door to protected domain 102A and, if equipment 104A is also protected such as through a secured rack or cage, allow the technician access to the equipment 104A.

The workflow controller 106 can then verify completion of the task(s), which can occur from receiving a notice back from the agent that the task is complete, or can interact with other computer systems, such as a monitoring/security system 108. For example, the agent may have a badge or other identification that can be scanned at the equipment 104A which would indicate that the technician has physically interacted with the equipment 104A and thus, likely has performed the task. As will also be further described herein, the workflow controller 106 can also be embodied to send a notice to the remediation system 110 if the technician did not enter the protected domain 102A within the requisite 30 minutes per the created task.

Figure 2:
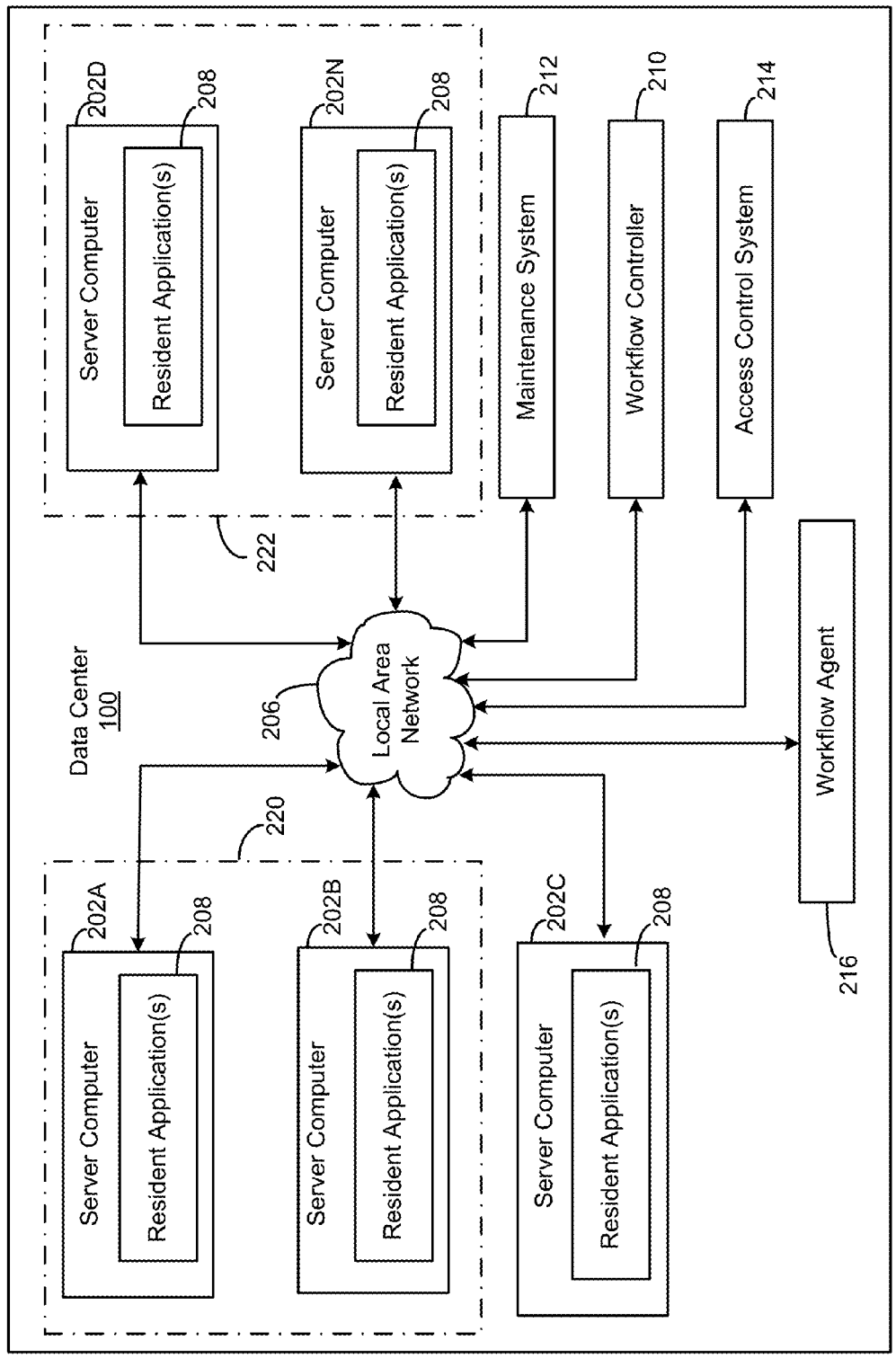
FIG. 2 illustrates a computing system diagram for a configuration for a data center that implements the concepts and technologies disclosed herein for allowing a workflow agent to selectively access to a protected logical network domain to perform tasks therein.

FIG. 2 illustrates a computing system diagram for a configuration for a data center 100 that implements the concepts and technologies disclosed herein for allowing a workflow agent 216 to selectively have access to a protected logical network domain 220, 222. The example data center 100 includes several server computers 202A-202N (which may be referred herein singularly as "a server computer 202" or in the plural as "the server computers 202") for providing computing resources for executing one or more applications 208. For instance, in one implementation the server computers 202 are configured to provide resident application(s) 208 as computing resources available to others across a network.

The server computers 202 may be standard tower or rack-mount server computers configured appropriately for providing the computing resources described above. Here, servers 202A and 202B are located in a protected domain 220 within the data center 100, such as within a physical firewall or other protected network access across the local area network 206. The protected logical network domain 220 can be used herein protect sensitive resident application(s) 208 on server computers 202A and 202B, e.g. sensitive or protected data held on those computer, or sensitive applications executing thereupon such as secure financial transactions.

In the example data center 100 shown in FIG. 2, an appropriate LAN 206 is utilized to interconnect the server computers 202A-202N and the workflow controller 210, the maintenance system 212, and an access control system 214. It should be appreciated that the network topology illustrated in FIG. 2 has been greatly simplified and that many more networks and networking devices may be utilized to interconnect the various computing systems disclosed herein. Appropriate load balancing devices or software modules might also be utilized for balancing a load between each of the server computers 202A-202N in data center 100. These network topologies and devices should be apparent to those skilled in the art.

In this embodiment, the data center 100 can have a plurality of protected logical domains 220,222 which are secure rooms that have limited access to servers 202A, 202B and 202D and 202N respectively, typically a firewall or secure communication path, which in this embodiment is controlled by access control system 214. Thus, a workflow agent 216, such as an intelligent software patch, that needs to access the resident application(s) 208 in protected logical domains 220, 222 will need to get the requisite access from the access control system 214 to be able to perform any requisite work task on the resident application(s) 208.

In this embodiment, the workflow controller 210 coordinates the access and configures permissions to the protected logical domains 220, 222 in accordance with a work order produced from a maintenance system 212, and the workflow controller 210 will interact with the access control system 214 to provide the necessary access to the protected domains 220, 222 as dictated by the scope of the work order. In this embodiment, an example of a workflow order from the maintenance system 212 for work to be performed by workflow agent 216 within a plurality of protected logical domains 220, 222 could be for the workflow agent 216 to access all resident application(s) 208 to patch code. One or more tasks are then created by the workflow controller 210 for the workflow agent 216 to access protected logical domains 220, 222 based upon the workflow order, e.g. the workflow agent 216 needs to enter through the firewall of the protected logical domains 220, 222 at the next opportune cycle to patch the resident application(s) 208 on servers 202A, 202B and 202D, 202N. The necessary interactions are made from the workflow controller 210 with the access control system 214 of the protected logical domains 220, 222 to selectively allow the workflow agent 216 to pass through the secure firewall based upon the created task(s), e.g. allow the patching to occur.

The workflow controller 210 will then verify that the task(s) has been completed by the workflow agent 216. The verification can occur from the workflow agent 216 itself sending notice back to the workflow controller 210, or from the access control system 214 indicating that access of the workflow agent 216 occurred to the protected domains 220, 222.

It should be appreciated that the task(s) can be created by the same workflow controller 210 that can occur in both physical protected domains, such as protected physical domains 102A-102N in FIG. 1, and protected logical domains 220,222 in FIG. 2, as could be required. For example, per a work order, a technician may need to access equipment 104A in protected domain 102A to replace a hard drive, and equipment 104A is location within logical protected domain 220 such that once the new hard drive is installed, the workflow agent 216 will need to access the equipment 104A to install software on the new hard drive. A plurality of workflow controllers, such as workflow controller 106 in FIG. 1 and workflow controller 210 in FIG. 2 can work in conjunction to configure the permissions and provide the appropriate access to protected domains for technicians and agents to perform the task(s).

It should further be appreciated that the data center 100 described in FIG. 2 is merely illustrative and that other implementations might be utilized. In particular, functionality described herein as being performed by one device might be performed by another, might be performed by other components, or might be performed by a combination of these or other components. Additionally, it should be appreciated that this functionality might be implemented in software, hardware, or a combination of software and hardware. Other implementations should be apparent to those skilled in the art.

Figure 3:
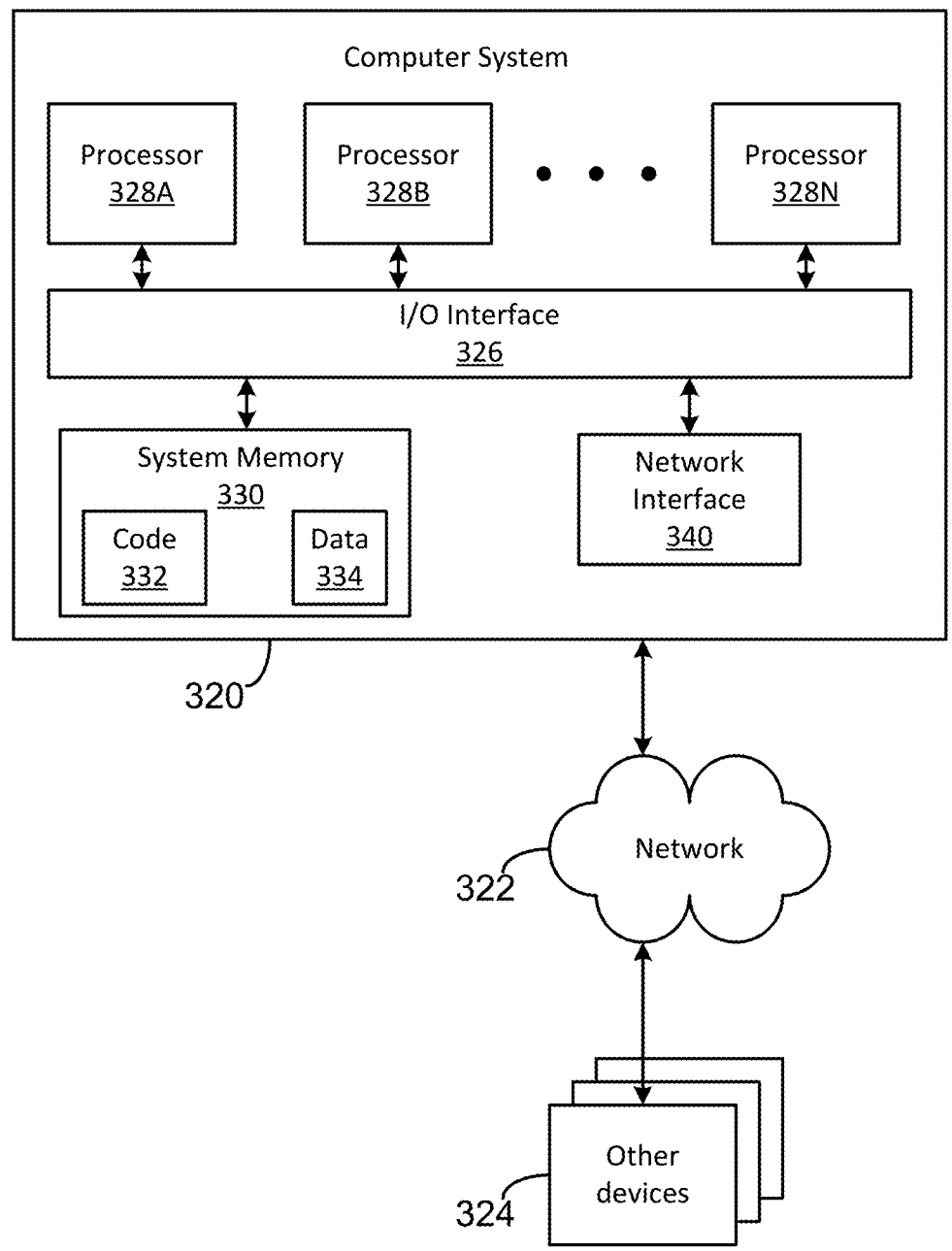
FIG. 3 is a block diagram illustrating an example of a computer platform communicating with other devices across a network.

In at least some embodiments, a server, such as workflow controller 106, that implements a portion or all of one or more of the technologies described herein, including the techniques to implement the functionality of predicting disk or sector failure, may include a general-purpose computer system that includes or is configured to access one or more computer-accessible media, such as computer system 320 illustrated in FIG. 3. In the illustrated embodiment, computer system 320 includes one or more processors 328 coupled to a system memory 330 via an input/output (I/O) interface 326. Computer system 320 further includes a network interface 140 coupled to I/O interface 326.

In various embodiments, computer system 320 may be a single processor system including one processor 328, or a multiprocessor system including several processors 328A-328N (e.g., two, four, eight, or another suitable number). Processors 328A-328N may be any suitable processors capable of executing instructions. For example, in various embodiments, processors 328A-328N may be general-purpose or embedded processors implementing any of a variety of instruction set architectures (ISAs), such as the x86, PowerPC, SPARC, or MIPS ISAs, or any other suitable ISA. In multiprocessor systems, each of processors 328A-328N may commonly, but not necessarily, implement the same ISA.

System memory 330 may be configured to store instructions and data accessible by processor(s) 328A-328N. In various embodiments, system memory 330 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 330 as code 332 and data 334.

In one embodiment, I/O interface 326 may be configured to coordinate I/O traffic between processors 328A-328N, system memory 330, and any peripheral devices in the device, including network interface 340 or other peripheral interfaces. In some embodiments, I/O interface 326 may perform any necessary protocol, timing or other data transformations to convert data signals from one component (e.g., system memory 330) into a format suitable for use by another component (e.g., processor 328a). In some embodiments, I/O interface 326 may include support for devices attached through various types of peripheral buses, such as a variant of the Peripheral Component Interconnect (PCI) bus standard or the Universal Serial Bus (USB) standard, for example. In some embodiments, the function of I/O interface 326 may be split into two or more separate components, such as a north bridge and a south bridge, for example. Also, in some embodiments some or all of the functionality of I/O interface 326, such as an interface to system memory 330, may be incorporated directly into one or more processors 328A-328N.

Network interface 340 may be configured to allow data to be exchanged between computer system 320 and other devices 324 attached to a network or networks 322, such as other computer systems or devices as illustrated in FIGS. 1-2, for example. In various embodiments, network interface 340 may support communication via any suitable wired or wireless general data networks, such as types of Ethernet network, for example. Additionally, network interface 340 may support communication via telecommunications/telephony networks such as analog voice networks or digital fiber communications networks, via storage area networks such as Fibre Channel SANs, or via any other suitable type of network and/or protocol.

In some embodiments, system memory 330 may be one embodiment of a computer-accessible medium configured to store program instructions and data for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 320 via I/O interface 326. A non-transitory computer-accessible storage medium may also include any volatile or nonvolatile media such as RAM (e.g. SDRAM, DDR SDRAM, RDRAM, SRAM, etc.), ROM, etc., that may be included in some embodiments of computer system 320 as system memory 330 or another type of memory. Further, a computer-accessible medium may include transmission media or signals such as electrical, electromagnetic, or digital signals, conveyed via a communication medium such as a network and/or a wireless link, which may be implemented via network interface 340. Portions or all of multiple computer systems such as that illustrated in FIG. 3 may be used to implement the described functionality in various embodiments; for example, software components running on a variety of different devices and servers may collaborate to provide the functionality.

Figure 4:
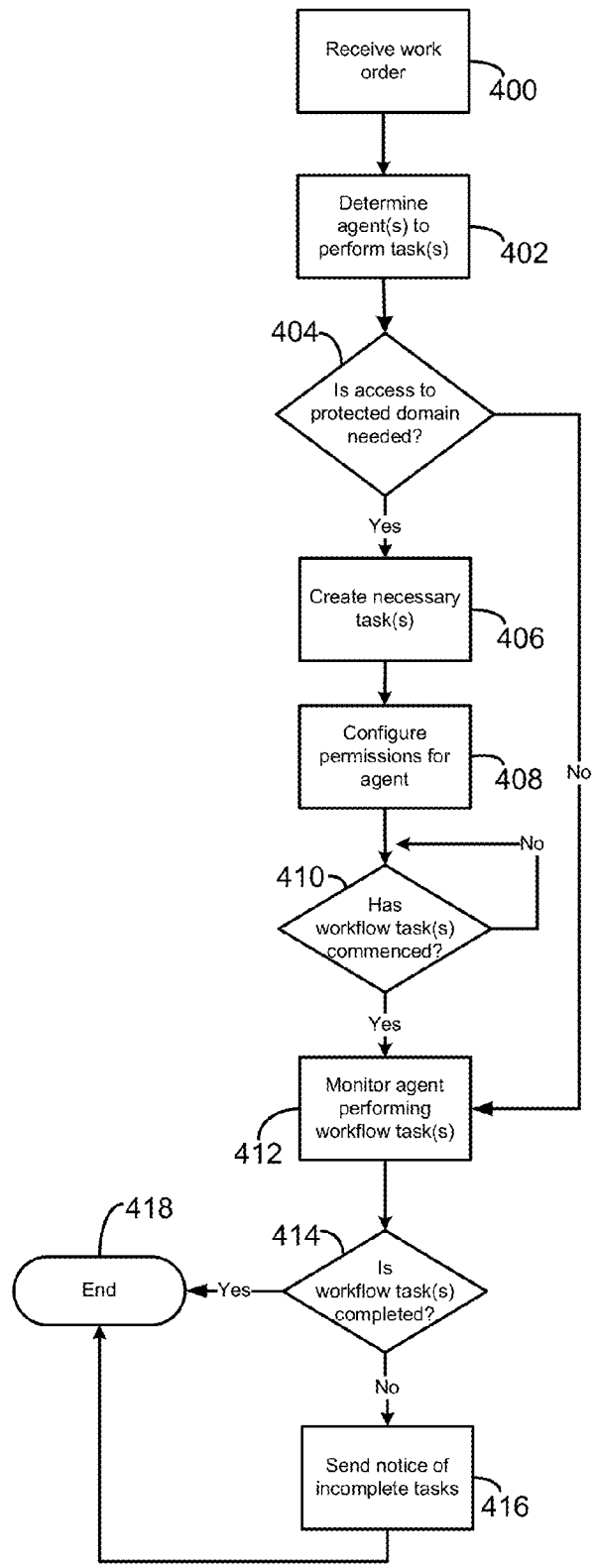
FIG. 4 is a flowchart illustrating one embodiment of a process for receiving a work order and creating at least one workflow task and configuring access for an agent to a protected domain through interacting with a monitoring/security system for the protected domain.
Figure 5:
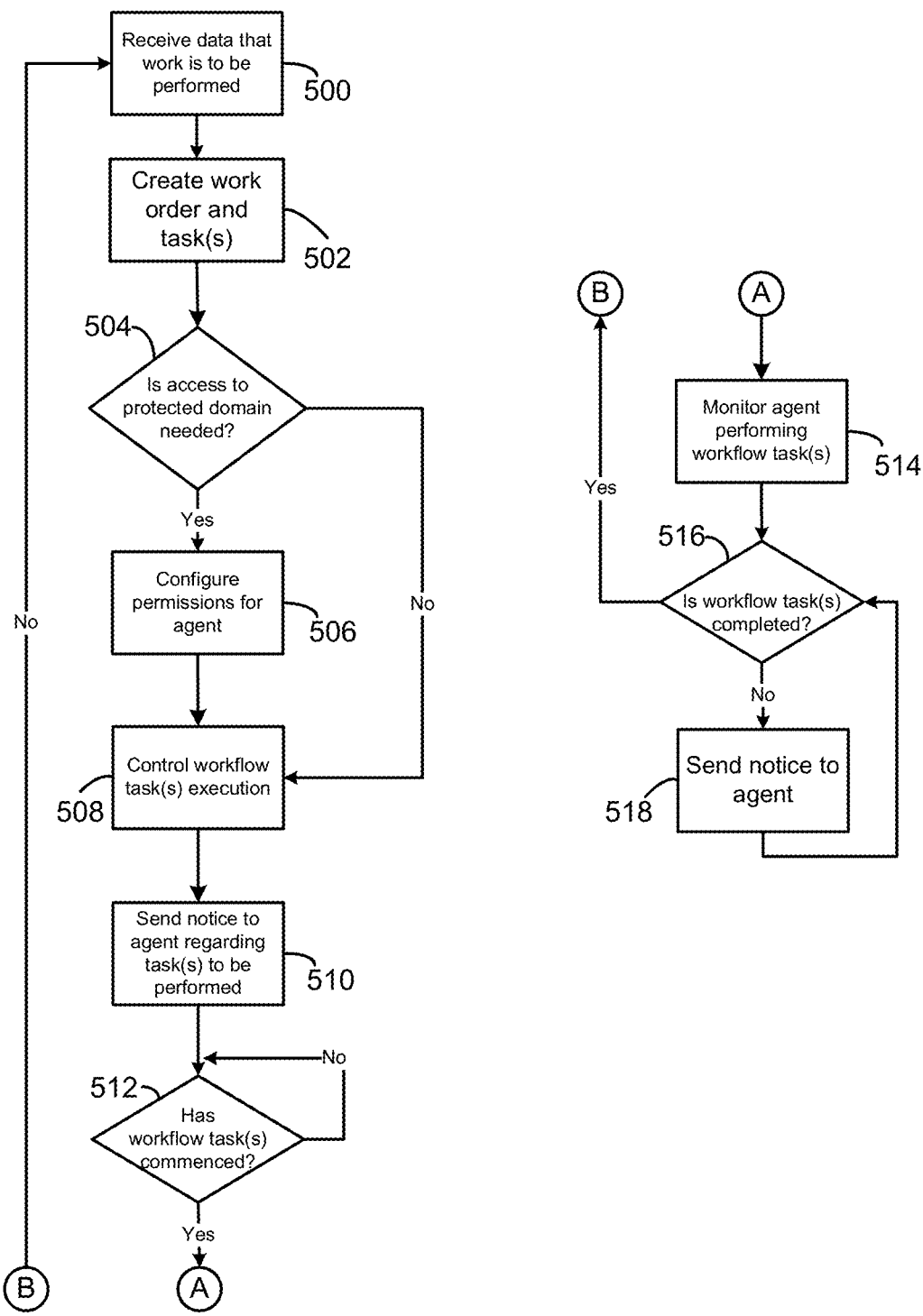
FIG. 5 is a flowchart illustrating one embodiment of a process that receives data indicating that work needs to be performed, creates at least one workflow tasks, contacts the agent to perform the task, then verifies the completion of the task.

FIGS. 4 and 5 are processes that the architecture of FIGS. 1, 2 and 3 may implement. These processes (as well as other processes described throughout) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible computing platforms, the architectures and techniques are equally applicable to other computing environments and computing devices.

FIG. 4 is a flowchart illustrating one embodiment of a process for receiving a workflow order, such as at workflow controller 106, with a workflow order sent by remediation system 110, determining which agent(s) should perform the task(s) and creating the necessary task(s) for the agent(s), and providing access to an agent (such as technician) to a protected domain through configuring permissions by interacting with a monitoring/security system 108 for the protected domain, such as physical protected domains 102A-102N. It should be noted that the workflow controller 106 and the remediation system 110 can be the same computer system, e.g. on one server. A work order is received, as shown at operation 400, and then the best available agent(s) is determined for the task(s) to address the work order, as shown at operation 402. The determination of the best agent can be based on a variety of criteria.

For example, the determination can be based upon a security level of the protected domain such as 102A-102N, a security clearance of the agent, a schedule of the agent, or a time requirement for completing a task. Further, such determination can be based upon what equipment is required to be serviced. Every piece of equipment within the data center 100 and protected domain 102A-102N, can have an asset identifier (such as a bar code tag in situ at the equipment or a general inventory of assets) and this information can be stored in a database along with other information that describes how the equipment is related to each other, such as what equipment will need to be fixed in sequence. Further, the workflow controller 106 can review the tasks for the work order (or several work orders in parallel) and determine if there is any dependency of the tasks such that a problem could occur with needed resources, e.g. access is needed by simultaneous agents, or in scheduling, e.g. task 1 of work order A must occur before task 1 of work order B. Any dependency can be handled within the tasks scheduled, or through the use of an ordered list as is further described herein.

Then a determination is made as to whether access to a protected domain is needed, as shown at decision 404, per the work order. For example, upon receipt of a work order for a specific piece of equipment, such as a server on a rack in a data center 100, the workflow controller 106 can look up an identifier for that server, perhaps accessing other databases that store information on the security for equipment generally, to determine if the server is in one or more protected domains, and can also include any other information related to repair or replacement of the server. The workflow controller 106 can then make a determination if the technician needs access to the protected domain, such as domains 102A-102N, to perform the specific task, e.g. server replacement, and can also determine if the agent(s) may need access to other protected domains as well as related to this server replacement.

The agent can also be determined based upon the "principle of least privilege" as applied to the secure domains necessary to perform the tasks. For example, the set of permissions for the agent must only grant access to information and resources that are required for the agent to complete the task(s). Furthermore, if the workflow controller 106 is embodied as creating and monitoring several tasks pursuant to several work orders, the workflow controller 106 can take the tasks of several related work orders into account and optimally allocate agents based upon common tasks, time required per task, proximity, access permissions granted, clearance level of the agent, etc., thus potentially having an agent perform tasks related to multiple work orders.

In this embodiment, if access is not needed to a protected domain at decision 404, then the process will monitor the agent performing the workflow task at operation 412 to thereby verify that the workflow tasks are ultimately completed. Conversely, the process itself can end at decision 404 if the workflow controller is only embodied, operation. Also, it should be noted that operation 402 can likewise occur after the determination of access to protected domains occurs at decision 404, and the requisite access to the protected domains for the agent(s) can be used to determine the agent(s) to perform the tasks.

Otherwise, if access to a protected domain is needed at decision 404, then one or more tasks are created that will occur to accomplish the work order, as shown at operation 406, to thereby create a workflow of tasks for one or more agents, and then the requisite permissions for the agent(s) are created, as shown at operation 408. In one embodiment, operation 408 would be sending the workflow tasks from the workflow controller 106 to the monitoring/security system 108. Then, in this embodiment, a determination is made as to whether the task(s) has commenced, as shown at decision 410. Although not necessary, the workflow controller 106 in this embodiment will interact with the monitoring system 108 and verify the arranged access to protected domains has occurred.

It should also be noted that the workflow controller 106 can generate the tasks as an ordered list such that a technician can follow the tasks on the list. For example, if task is to replace a hard drive, the scheduled task may include for the technician to go to parts room to get a replacement hard drive; go to the room where the disk is broken; open up the rack; power off the broken server (or other servers); and unlock server to remove the disk. Each of these tasks can have a specific level of security clearance needed for the technician, e.g. to access the parts room, to access the server rack, to turn off the server, etc. The workflow controller 106 can also optimally order the tasks needed to satisfy the work order. The ordered list can also avoid any detected dependencies (if the workflow controller 106 is so embodied) with the structured sequence of tasks.

If the task(s) has not commenced at decision 410, the process iterates thereat to wait for the workflow to commence. Otherwise, if the task(s) has commenced at decision 410, then the agent is monitored as the agent performs the task, as shown at operation 412, and then a decision is made as to whether the agent has performed the task, as shown at decision 414, thus verifying completion of the task. For example, the workflow controller 106 can interact with the monitoring security system 108 to see if the technician has entered and exited protected area 102A per the task(s). If the agent has performed the task(s) at decision 414, then the operation ends at termination 418. At termination 418, any access rights granted the agent to perform the tasks can then be revoked. Otherwise, if the agent has not performed the task at decision 414, then a notice is sent indicating that the workflow task(s) is incomplete, such as remediation system 110, as shown at operation 416, and then the process ends at termination 418. The maintenance service (such as remediation server 110) can then take appropriate action in view of the tasks not having been completed. Rather than terminating, the process can also iterate to receive other work orders and recommence, and could also operate in parallel, creating and monitoring several tasks created in response several different work orders. Furthermore, the workflow controller 106 can also manage the agents and resources to optimally perform tasks related to multiple work orders, e.g. if the technician is in the protected domain already and different work orders are present for equipment in the domain.

It should be noted that the monitoring of the agent can be done by itself at the workflow controller 106, or can be shared with another computer or sent completely for another computer to perform, such as monitoring/security system 108. For example, if the task was to move inventory, the workflow controller 106 can see if the inventory system has been updated in accordance with the task. Furthermore, the monitoring process of the agent can be broken down into monitoring only specific components of multiple task completion, and the workflow controller 106 can be embodied so as to make a revised workflow order to send out to the agent(s) to complete the original workflow order.

The workflow controller 106, in one embodiment, can also determine the optimal permissions needed to complete the work order by one or more agents, and can select an agent to perform the work based upon a variety of criteria. For example, the workflow controller 106 may select an agent that is at work currently, but is in proximity to the domain where the work is needed to be performed. The criteria may also be, for example but without limitation, whether the agent has free time, or whether the agent has the permissions already to perform the task(s) of the work order. Alternatively, the workflow controller 106 can perform a best fit analysis and configured permissions for one or more agents, if needed, to optimally perform the task(s).

FIG. 5 is a flowchart illustrating one embodiment of a process that could be performed by the workflow controller 210 in FIG. 2, wherein the workflow controller also creates the initial work order. Data that work needs to be performed is received, as shown at operation 500, such as, for example, a report that certain equipment has failed and needs replacing. A work order is then created by the workflow controller 210, as shown at operation 502, which in this example would be creating an order to replace the equipment. Here, the maintenance system 212 can send the maintenance data to the workflow controller 210 to create the work order directly. Then a determination is made as to whether access to a protected domain is needed, as shown at decision 504, per the task(s). For example, will the workflow agent 216 need access to the protected logical domains 220,222 to effect an update or repair. If access is not needed to a protected domain at decision 502, then the process forwards to operation 508 to control the workflow task(s) execution, which in this embodiment would involve sending the workflow agent 216 to the resident application(s) 208 or servers 202A, 202B, 202D or 202N to perform the necessary tasks. In some embodiments, the workflow agent 216 may be invoked if the agent is already instantiated and operational on the computer platform.

Otherwise, if access to a protected domain is needed at decision 504, then the requisite permissions are configured, such as contacting access control system 214 to allow agent access to the protected domain, as shown at operation 506, and then the execution of the workflow task(s) controlled, as shown at operation 508. The control of the task(s) execution at operation 508 can be handed off to another system if the workflow controller 210 is thus configured. A notice is then sent out to the agent regarding the task to be performed, such as to the workflow agent 216, as shown at operation 510. Operation 510 is present in this embodiment because the work order is being created by the workflow controller 210 and thus, the maintenance system 212 is not alerting the agent resources to the needed work. The notice given in operation 510 can thus be a work order itself identifying the task(s) to be done, or the actual task(s) themselves that the agent is to commence doing.

It should further be noted that, in some embodiments, the workflow controller 210 can invoke intermediate agents that themselves do not perform the task to complete the work order, but can provide further data to the workflow controller 210, such as further diagnostic testing, location and status of agents, full system diagnostics, etc., to assist the workflow controller 210 in scheduling the tasks to perform the work order. In such instance, the workflow controller can provide appropriate access to the assistive agents in gathering the data needed to assist in scheduling the tasks.

Then, in this embodiment, a determination is made as to whether the scheduled workflow task(s) has commenced, as shown at decision 512. Although not necessary, the workflow controller 210 in this embodiment can interact with either the access control system 214, the workflow agent 216, or both to verify the arranged access to protected logical domains 220,222 has occurred.

If the workflow task(s) has not commenced at decision 512, the process iterates there to wait for the workflow to commence. Otherwise, if the workflow task(s) has commenced at decision 512, then the agent is monitored as the agent performs the task(s), as shown at operation 514, and then a decision is made as to whether the agent has complete the task(s), as shown at decision 516. Such monitoring can occur directly, such as with the agent periodically informing the workflow controller 210 of the agent status, such as location and current task being performed, and/or completed. Or the monitoring of the agent can occur indirectly. For example, the workflow controller 210 can interact with the access control system 214 to determine if the workflow agent 216 has accessed protected logical domain 220 per the task(s) to update the resident application(s) 208, e.g. the access control system 214 will have data indicating that the agent was in the domain for the requisite amount of time to have completed the scheduled task. If the workflow agent 216 has performed the task(s) at decision 516, then the process reverts to receive incoming data at operation 500. Otherwise, if the agent has not performed the task(s) at decision 516, then a notice is sent to the agent, such as workflow agent 216, as shown at operation 518, and then the process again reverts to decision 516 to determine if the agent has performed the task(s).

In one embodiment, decision 516 can be verifying performance of the task, and then sending a notice to the agent, similar to operation 518, wherein the agent is sent to the next task. Thus, if a series of tasks have been created by the workflow controller 210, the agent can be controlled and/or monitored as the agent progresses from task to task, with any prerequisite tasks being verified as completed. For example, if work on equipment 102B is predicated on equipment 104A having been upgraded, after a technician exits domain 102A having performed work on and upgraded equipment 104A and thus, verifying completion at decision 516, then the notice can be sent to the technician to enter 102B to perform work on equipment 104B. The notice can also be sent to a different agent at operation 518 to complete the work order. For example, if the scheduled tasks are for the replacement of a hard disk, upon the technician verifying to the workflow controller 210 installation of the equipment 104A (at decision 516), such as through scanning the identifier of the new equipment being installed, then the workflow controller 210 can send notice to workflow agent 216 to install the requisite software.

In the present embodiment, it should be noted that same system can perform all of the functions delineated above for the workflow controller 210 and maintenance system 212, which here occurs as the workflow controller 210 is also creating the initial work order in this embodiment. Furthermore, the workflow controller 210 is also shown at directing the workflow agent 216 to perform various functions in interacting with the servers 202A-202N of the data center 100, but it should be appreciated that the workflow controller 210 can fully or partially control any maintenance asset that may be deployed in the data center 100, or can simply send instructions to the relevant systems to have the work of the work order performed. Furthermore, the methodology shown above can apply to multiple groups of agents performing multiple tasks that include access to protected domains.

It should be noted that several functionalities are included in the processes of FIGS. 4 and 5 that are merely shown for illustration, and can all be used together in the same system, or separately with independent operations of the processes used by themselves. Other functionalities can likewise be added to the processes to enhance the ability to facilitate access of agents to protected domains as would be apparent to one of skill in the art.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A data center, comprising:
a first system including a processor coupled to a memory, the memory including instructions that upon execution by the processor cause the first system to:
receive a work order for work to be performed on a piece of equipment located within a domain of the data center;
create at least one task for at least one agent to perform work on the piece of equipment based upon the work order, the at least one agent comprising a software agent, the software agent being selected based at least on a determination that the software agent has a security clearance that qualifies the software agent to perform the at least one task and the security clearance is lower than respective security clearances of one or more other software agents available to perform the at least one task;
appending administrative rights to the software agent, the administrative rights enabling the software agent to access data in order to repair the piece of equipment;
access, from a database, data corresponding to an individual identifier associated with the piece of equipment identifying relationships between the piece of equipment and other pieces of the equipment;
determine, based at least in part on the relationships between the piece of equipment and the other pieces of the equipment, task dependencies to identify one or more sub-tasks required to complete the at least one task;
generate a sequence in which to complete the one or more sub-tasks in order to complete the at least one task, the sequence being based at least in part on the task dependencies;
configure first access permissions associated with a monitoring system to enable access by the at least one agent to a first part of the domain via a first secure communication path based at least in part upon the sequence, the first part of the domain being associated with a first sub-task of the at least one task;
receive information indicating the first sub-task of the at least one task is complete;
interact with the monitoring system to revoke the first access permissions by the at least one agent to the first part of the domain;
configure second access permissions associated with the monitoring system to enable access by the at least one agent or a different agent to a second part of the domain via a second secure communication path based at least in part upon the sequence, the second part of the domain being associated with a second sub-task of the at least one task;
receive information indicating a second sub-task of the at least one task is complete; and
interact with the monitoring system to revoke the second access permissions by the at least one agent or the different agent to the second part of the domain; and
send a notice to the at least one agent or the different agent upon failure to verify completion of the at least one task.

2. The data center of claim 1, the first system further comprising:

an access control system including a processor coupled to a memory, the memory including instructions that upon execution by the processor cause the access control system to:
receive a request from the first system to enable access of the at least one agent to the domain; and
store information granting the at least one agent permission to access the domain.

3. The data center of claim 2, the instructions further causing the first system to select at least one or more additional agents to perform at least one of the at least one task or the one or more sub-tasks.

4. The data center of claim 3, the instructions further causing the first system to select the at least one or more additional agents based at least in part on at least one of: a security level of the domain, a security clearance of the at least one or more additional agents, a schedule of the at least one or more additional agents, or a time requirement for completing the at least one task and the one or more sub-tasks.

5. A system, comprising:
a processor coupled to a memory, the memory including instructions that upon execution by the processor cause the system to:
create at least a first task and a second task for an agent to perform in a protected domain of a facility, the agent being a software agent configured with administrative rights to update software within the protected domain of the facility, wherein at least the first task and the second task is allocated to the software agent based on at least a time required per task and a commonality of a first task type associated with the first task and a second task type associated with the second task;
access, from a database, data corresponding to individual identifiers corresponding to individual resources associated with the protected domain, the individual identifiers identifying relationships between the individual resources;
determine, based at least in part on the individual identifiers, task dependencies to identify one or more sub-tasks required to complete the first task and the second task, the one or more sub-tasks including at least a first sub-task associated with the first task and a second sub-task associated with the second task;
determine, based at least in part on the individual identifiers and the one or more sub-tasks, a set of one or more access control permissions necessary for the agent to perform the first task and the second task;
configure a first access control permission of the set of one or more access control permissions to enable access by the agent to a first part of the protected domain, the first part of the protected domain being associated with the first sub-task;
receive information indicating that the first sub-task was completed;
configure, in response to receiving information indicating that the first sub-task was completed, a second access control permission of the set of one or more access control permissions to enable access by the agent or a different agent to a second part of the protected domain, the second part of the protected domain being associated with the second sub-task;
receive information indicating that the second sub-task was completed; and
send a notice to the software agent upon failure to verify completion of the first task or the second task.

6. The system of claim 5, wherein the instructions upon execution by the processor, further cause the system to:
determine that the protected domain is a room in a data center;
determine that access to the room is restricted by a card reader system; and
configure the card reader system to communicate with a security system that uses the set of one or more access control permissions to determine whether to grant the different agent access to the room.

7. The system of claim 5, wherein the instructions upon execution by the processor, further cause the system to:
determine that the protected domain is located in a facility that includes a security system controlling access to one or more protected domains; and
determine the set of one or more access control permissions for the agent or the different agent based at least in part on interacting with the security system to allow access of the agent to a secure area of the individual resources to perform the first or second task.

8. The system of claim 5, wherein the protected domain is a secure logical network domain, and wherein the instructions upon execution by the processor, further cause the system to:
determine that a security system controls data access to the secure logical network domain; and
determine the set of one or more access control permissions for the agent or the different agent based at least in part on interacting with the security system to allow data access of the agent or the different agent to the individual resources associated with the secure logical network domain.

9. The system of claim 5, wherein the instructions, upon execution by the processor, further cause the system to contact other computer systems to verify completion of the first or second task.

10. The system of claim 5, wherein the instructions, upon execution by the processor, further cause the system to verify completion of the first or second task from information received from the agent or the different agent.

11. The system of claim 5, wherein the instructions, upon execution by the processor, further cause the system to determine, based at least in part on the task dependencies, a work order.

12. The system of claim 5, wherein the instructions, upon execution by the processor, further cause the system to receive a work order for work to be performed by at least the agent within a plurality of protected domains.

13. The system of claim 5, wherein the instructions, upon execution by the processor, further cause the system to create an ordered list of at least the first or second tasks or the one or more sub-tasks for at least the agent to perform.

14. The system of claim 5, wherein the instructions, upon execution by the processor, further cause the system to determine the agent for the first or second task based upon at least one of: a security level of the protected domain, a security clearance of the agent, a schedule of the agent, or a time requirement for completing the first or second task.

15. The system of claim 5, wherein the instructions, upon execution by the processor, further cause the system to determine the agent or the different agent for the first or second task based upon a principle of least privilege for access to the first part of the protected domain or the second part of the protected domain, such that the set of one or more access control permissions only grant access to information and resources that are required for the agent or the different agent to complete the first or second task.

16. The system of claim 5, wherein the instructions, upon execution by the processor, further cause the system to revoke the first access control permission and the second access control permission of the set of one or more access control permissions to the agent or the different agent.

17. The system of claim 5, wherein the access control permissions include at least one physical access permission and one logical access control permission.

18. A method performed by one or more processors, the method comprising:
creating at least one task for an agent to perform in a protected domain of a facility, the agent being a software agent configured with administrative rights to repair equipment within the protected domain and the software agent being selected based at least on a determination that the software agent has a security clearance that qualifies the software agent to perform the at least one task and the security clearance is lower than respective security clearances of one or more other software agents available to perform the at least one task;
accessing, from a database, data corresponding to individual identifiers corresponding to individual resources associated with the protected domain, the individual identifiers identifying relationships between the individual resources;
determining, based at least in part on the individual identifiers, task dependencies to identify one or more sub-tasks required to complete the at least one task;
determining, based at least in part on the individual identifiers and the one or more sub-tasks, a set of one or more access control permissions necessary for the agent to perform the at least one task;
configuring a first access control permission of the set of one or more access control permissions to enable access by the agent to a first part of the protected domain via a first secure communication path, the first part of the protected domain being associated with a first sub-task;
receiving information indicating that the first sub-task was completed;
configuring a second access control permission of the set of one or more access control permissions to enable access by the agent or a different agent to a second part of the protected domain via a second secure communication path, the second part of the protected domain being associated with a second sub-task;
receiving information indicating that the second sub-task was completed; and
sending a notice to the agent or the different agent upon failure to verify completion of the at least one task.

19. The method of claim 18, further comprising:
determining that the protected domain is restricted by a card reader system; and
configuring the card reader system to communicate with a security system that uses access control permissions to determine whether to grant access to the protected domain.

20. The method of claim 18, further comprising:
determining that the protected domain is located in a facility that includes a security system controlling access to a secure logical network domain; and
determining the set of one or more access control permissions for the agent based at least in part on interacting with the security system to allow access of the agent to the secure logical network domain to perform the at least one task.

21. The method of claim 18, further comprising:
determining that a security system controls data access to the secure logical network domain; and
determining the set of one or more access control permissions for the agent based at least in part on interacting with the security system to allow data access of the agent or the different agent to the individual resources associated with the secure logical network domain.

22. The method of claim 18, further comprising contacting other computer systems to verify completion of the at least one task.

23. The method of claim 18, further comprising verifying completion of the at least one task from information received from the agent or the different agent.

24. The method of claim 18, further comprising receiving a work order for work to be performed by at least the agent within a plurality of protected domains.

25. The method of claim 18, further comprising creating an ordered list of tasks for at least the agent to perform.

26. The method of claim 25, further comprising: determining at least the agent or the different agent based at least in part on the task dependencies; and
creating the ordered list based at least in part on the task dependencies.

27. The method of claim 18, further comprising determining at least the agent to perform the at least one task and the one or more sub-tasks based upon at least one of: a security level of the protected domain, a security clearance of at least the agent, a schedule of at least the agent, or a time requirement for completing the at least one task.

28. The method of claim 18, further comprising revoking the first access control permission and the second access control permission of the set of one or more access control permissions to the agent or the different agent.

29. The method of claim 18, further comprising determining the set of one or more access control permissions based at least in part on at least one physical access permission and one logical access control permission.

30. A computer readable storage medium containing instructions that, when executed by one or more processors, causes performance of:
creating at least a first task and a second task for an agent to perform in a protected domain of a facility, the agent being a software agent configured with administrative rights to repair equipment within the protected domain, wherein at least the first task and the second task is allocated to the software agent based on at least a time required per task and a commonality of a first task type associated with the first task to a second task type associated with the second task;
accessing, from a database, data corresponding to individual identifiers corresponding to individual resources associated with the protected domain, the individual identifiers identifying relationships between the individual resources;
determining, based at least in part on the individual identifiers, task dependencies to identify one or more sub-tasks required to complete the at least one task;
determining, based at least in part on the individual identifiers and the one or more sub-tasks, a set of one or more access control permissions necessary for the agent to perform the first task and the second task, the one or more sub-tasks including at least a first sub-task associated with the first task and a second sub-task associated with the second task;

configuring a first access control permission of the set of one or more access control permissions to enable access by the agent to a first part of the protected domain, the first part of the protected domain being associated with the first sub-task;
receiving information indicating that the first sub-task was completed;
configuring, in response to receiving information indicating that the first sub-task was completed, a second access control permission of the set of one or more access control permissions to enable access by the agent or a different agent to a second part of the protected domain, the second part of the protected domain being associated with the second sub-task;
receiving information indicating that the second sub-task was completed; and
sending a notice to the software agent upon failure to verify completion of the first task or the second task.

31. The non-transitory computer readable storage medium of claim 30, wherein:
the protected domain is
restricted by a card reader system; and
the card reader system is configured to communicate with a security system that uses the set of one or more access control permissions to determine whether to grant access to the room.

32. The non-transitory computer readable storage medium of claim 30, wherein the protected domain is a secure logical network domain.

33. The non-transitory computer readable storage medium of claim 32, wherein:
the secure logical network domain has computing resources there within, and a security system controls data access to the secure logical network domain; and
determining the set of one or more access control permissions for the agent or the different agent is based at least in part on interacting with the security system to allow data access of the agent to the individual resources within the secure logical network domain.

34. The system of claim 5, further comprising determining the set of one or more access control permissions based at least in part on determining specific levels of security clearance required for each of the one or more sub-tasks.

35. The data center as claim 1 recites, further comprising determining that the individual identifier associated with the piece of equipment comprises a bar code.

36. The non-transitory computer readable storage medium of claim 30, wherein the first access control permission and the second access control permission limit access of the software agent to data required to complete the respective sub-tasks.

* * * * *